US006998956B2

(12) United States Patent
Dix

(10) Patent No.: US 6,998,956 B2
(45) Date of Patent: Feb. 14, 2006

(54) ACCESS CONTROL SYSTEM FOR A WORK VEHICLE

(75) Inventor: Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 248 days.

(21) Appl. No.: 10/431,280

(22) Filed: May 7, 2003

(65) Prior Publication Data

US 2004/0017281 A1 Jan. 29, 2004

Related U.S. Application Data

(63) Continuation-in-part of application No. 09/752,009, filed on Dec. 28, 2000.

(51) Int. Cl.
*H04Q 9/00* (2006.01)
*G08C 19/00* (2006.01)
*E01H 8/02* (2006.01)
*E02F 3/58* (2006.01)

(52) U.S. Cl. ............... 340/5.2; 340/5.61; 340/5.74; 340/5.25; 340/825.69; 37/202; 37/397

(58) Field of Classification Search .......... 340/5.2, 340/5.61, 5.74, 5.25, 825.69; 37/202, 397
See application file for complete search history.

(56) References Cited

U.S. PATENT DOCUMENTS

| 4,852,680 | A | | 8/1989 | Brown et al. |
| 5,369,581 | A | | 11/1994 | Ohsuga et al. |
| 5,508,694 | A | | 4/1996 | Treharne et al. |
| 5,528,843 | A | * | 6/1996 | Rocke ........................ 37/348 |
| 5,610,574 | A | | 3/1997 | Mutoh et al. |
| 5,745,026 | A | | 4/1998 | Kokubu et al. |
| 5,808,372 | A | | 9/1998 | Schwegler et al. |
| 5,815,071 | A | | 9/1998 | Doyle |
| 5,886,421 | A | | 3/1999 | Mizuno et al. |
| 5,969,633 | A | | 10/1999 | Rosler |
| 6,020,827 | A | | 2/2000 | Konrad et al. |
| 6,025,653 | A | | 2/2000 | Hayashi et al. |
| 6,144,113 | A | | 11/2000 | Hayashi et al. |
| 6,154,694 | A | | 11/2000 | Aoki et al. |
| 6,225,890 | B1 | * | 5/2001 | Murphy ................. 340/426.19 |
| 6,269,292 | B1 | | 7/2001 | Kokubu et al. |
| 6,275,141 | B1 | * | 8/2001 | Walter ...................... 340/5.64 |
| 6,380,842 | B1 | | 4/2002 | Mattes et al. |
| 6,430,488 | B1 | | 8/2002 | Goldman et al. |
| 6,480,117 | B1 | | 11/2002 | Flick |
| 6,496,107 | B1 | | 12/2002 | Himmelstein |
| 6,501,369 | B1 | | 12/2002 | Treharne |
| 6,522,251 | B1 | | 2/2003 | Menne et al. |

(Continued)

*Primary Examiner*—Michael Horabik
*Assistant Examiner*—Scott Au
(74) *Attorney, Agent, or Firm*—John William Stader; Stephen A. Bucchianeri

(57) ABSTRACT

A system and method for controlling access to a work vehicle includes limiting an unauthorized operator's access to the work vehicle by disabling an engine subsystem and additionally limiting access to another vehicle system such as an auxiliary fluid actuator, by disabling at least one of the auxiliary fluid actuators. In this manner, even if a thief hot wires the engine of the work vehicle, he will not be able to use the work vehicle since the engine and the fluid actuators and the fluid controller that controls the actuators are independently disabled.

12 Claims, 3 Drawing Sheets

U.S. PATENT DOCUMENTS 6,538,557 B1 3/2003 Giessl
6,552,648 B1 4/2003 Rick et al.
2002/0019689 A1 2/2002 Harrison et al.
2002/0084887 A1 7/2002 Arshad et al.

* cited by examiner

ACCESS CONTROL SYSTEM FOR A WORK VEHICLE

RELATED APPLICATIONS

This application is a continuation-in-part of U.S. patent application Ser. No. 09/752,009 Dec. 28, 2000 which is incorporated herein by reference for all that it teaches, and claims the benefit under Title 35, United States Code, § 120 of that application, insofar as the subject matter of each of the claims of this application is not disclosed in that application in the manner provided by the first paragraph of Title 35, United States Code, § 112.

BACKGROUND OF THE INVENTION

Access control or security systems for vehicles, and, in particular, work vehicles, have been provided using a variety of techniques and structures. In a security system in common use in automobiles, an electronic module is inserted between the engine control circuit and the engine to disable certain functions of the engine, such as the spark getting to the spark coil. In simple aftermarket security systems such as the above, it is relatively easy to bypass the security system and start the vehicle by inserting one or two simple electrical jumpers between the aftermarket control circuit and the engine. An unauthorized user can easily "hotwire" these work vehicles and automobiles. This is a particular problem in work vehicles that have relatively simply access control systems. In many instances, the work vehicles are not controlled by a microprocessor and thus there are only a few wires and electrical connections in the control circuits that must be established (or bypassed if disabled) to start and run the vehicle.

Many relatively simple work vehicles do have some degree of complexity, in that they also have an electronic circuit that is responsive to operator command signals provided by manually moveable control levers and switches that cause the various fluid actuators on the work vehicle to move. Many work vehicles also have a separate circuit to control the engagement, shifting and disengagement of the transmission. Thus, many work vehicles, such as skid steer loaders and loader-backhoes, have simply engine control circuits and complex microprocessor controller circuits to control the work implements, such as the lifting and tilting of the bucket, the rate of flow of pressurized fluid into and out of the actuators, and similar controller circuits to control transmission operation.

For work vehicles such as the above, and for other vehicles for which an increased level of security is desired, it would be particularly useful to disable not only the engine but also another vehicle function, such as the transmission or the auxiliary fluid control circuit in a work vehicle. The auxiliary fluid control circuit permits the vehicle operator to move the various fluid actuators coupled to the vehicle. As an alternative, the control circuit that controls the transmission could also be disabled. In any vehicle with dual disablement, an unauthorized user, such as a thief, would not only have to bypass or hotwire the security system preventing the engine from starting, but would also be required to independently and separately bypass or hotwire the electronic circuit controlling the auxiliary implements or the transmission (or both). Only by over-coming both the engine and the second system disabling feature could an unauthorized operator start, move, and use the vehicle.

Thus, even if the unauthorized operator could hotwire the engine, his inability to also enable the auxiliary fluid system or the transmission system would make it difficult to operate the vehicle, particularly for example if the various fluid actuators were lowered to engage the ground or the transmission was disabled or in low gear. This additional security feature would make it less likely that a thief would attempt to steal the work vehicle.

It is therefore an object of this invention to provide an access control or security system for a work vehicle having an engine coupled to a transmission and one or more fluid actuated implements. It is a further object of this invention to provide a security system that disables the work vehicle not only by disabling the engine but also by disabling at least one additional system or subsystem of the vehicle, such as the auxiliary fluid actuators or the transmission.

SUMMARY OF THE INVENTION

In accordance with the first embodiment of the invention, a method for controlling access to a work vehicle having an engine, a transmission, auxiliary fluid actuators, and an control switch, is provided. The vehicle is accessible with a combined transponder and control key. The method includes activating a control switch with a control key, transmitting data indicative of an authorized level of access to a control system of the vehicle from the data transponder, comparing the transmitted data with data stored in the vehicle control system to determine an authorized level of access, and limiting access to the work vehicle by disabling at least two subsystems of the work vehicle.

The method of limiting access to the engine may include disabling at least one of the following subsystems: an engine ignition subsystem, an engine fuel subsystem, and an engine starting subsystem. The method of limiting access to the auxiliary fluid actuators may additionally include electronically preventing the operation of one or more of a swing actuator, a boom actuator, a dipper actuator, a bucket or tilt actuator; a front loader actuator, and a lift arm actuator. The method of electronically preventing access to the work vehicle may include preventing operation of a fluid actuator of a backhoe, a front loader, or other fluid actuated work vehicle implement. The method of controlling access to a work vehicle may also include communicating a message packet over a serial communication bus that couples at least two microprocessor based electronic controllers, wherein one of the two microprocessor based electronic controllers includes an auxiliary fluid controller coupled to the auxiliary fluid actuators.

In accordance with a second embodiment of the invention, a control system for controlling access to a work vehicle having an engine with engine subsystems, a transmission, and an auxiliary fluid controller coupled to and configured to control a plurality of fluid actuators is provided. A control key is configured to operate a control switch. A transponder, such as a radio transponder for example, is coupled to the control key and contains data indicating an authorized level of access to the work vehicle. A vehicle control system is coupled to the engine, the transmission and the auxiliary fluid controller. The transponder is configured to transmit data indicating an authorized level of access to the work vehicle control system. The work vehicle control system is configured to responsively compare the transmitted data with data stored in the vehicle control system to determine the authorized level of access and to responsively limit access to the work vehicle by disabling at least one subsystem of the engine and to responsively and additionally limit access to either the transmission or at least one of the auxiliary fluid actuators by disabling either the transmission or at least one of the auxiliary fluid actuators. The engine subsystems may include an engine ignition subsystem, and the vehicle control system may be configured to control access to the engine by disabling the engine ignition subsystem. The engine subsystems may include an engine fuel subsystem, and the vehicle control system may be configured to control access to the engine by disabling the engine fuel subsystem. The engine subsystems may include an engine starting subsystem, and the vehicle control system may be configured to control access to the engine by disabling the engine starting subsystem. The vehicle control system may be configured to electronically prevent an unauthorized operator from operating one or more of the fluid actuators including a swing actuator, a boom actuator, a dipper actuator, a bucket or tilt actuator; loader actuator and a lift arm actuator, for example. The vehicle control system may be configured to prevent an unauthorized operator from using a fluid actuator in a backhoe, a front loader, or any other work vehicle having a fluid actuator such as a lift arm actuator, for example. The control system may also include a serial communication bus coupling the vehicle control system and the auxiliary fluid controller.

BRIEF DESCRIPTION OF THE DRAWINGS

The invention will become more fully understood from the following detailed description when taken in conjunction with the accompanying drawings, wherein like reference numerals refer to like parts.

DETAILED DESCRIPTION OF THE PREFERRED EMBODIMENT

Figure 1:
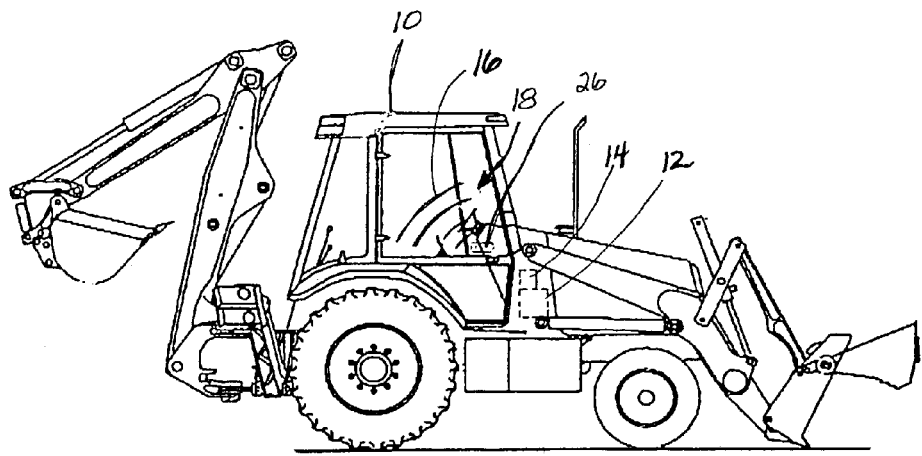
FIG. 1 illustrates the overall access control system, including a work vehicle with a control system that is configured to communicate with a transponder.
Figure 1:
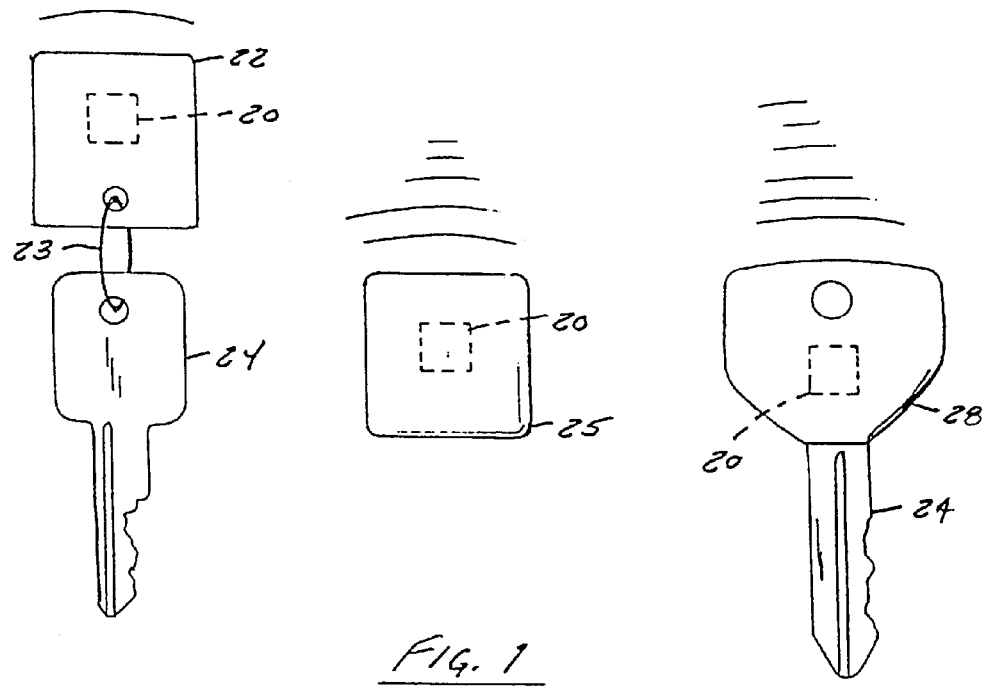

Referring to FIG. 1, a work vehicle 10 has a control system 12 that includes a reader circuit 14. The reader circuit generates an electromagnetic field 16 within the operator station or cab 18 of the vehicle and preferably in the local proximity of the cab. This electromagnetic field impinges on a transponder 20 that is carried by an authorized operator of the vehicle. When the operator is adjacent to or in the work vehicle, the electromagnetic field 16 generated by reader 14 is sufficiently strong to energize the transponder 20. In response to being energized, the transponder 20 transmits data, as for example via radio waves, to the reader circuit 14 which reads the data and takes predetermined actions based upon that data.

The transponder 20 may be provided in one of several preferred forms. Transponder 20 may be in a key fob, preferably molded into a plastic case 22 that is impervious to moisture (for typical operating conditions). Key fob 22 is mechanically coupled to a control (or ignition) key 24 by connector 23. Control key 24 is configured to fit into and activate control switch 26 of the vehicle, such as an ignition switch. In this arrangement, the control key permits the vehicle operator to start the vehicle engine. Transponder 20 is accessed by the vehicle control system 12 to determine what vehicle functions, operations, systems or sub-systems the operator is authorized to use or is not permitted to use.

Transponder 20 may alternatively be molded into a thin credit card-sized sheath 25. Again, the sheath is preferably impervious to moisture under ordinary operating conditions. In this form, transponder 20 is not mechanically coupled to a control key, and is therefore easily carried in the operator's wallet, shirt pocket or pants pocket.

Transponder 20 may alternatively and preferably be molded into the plastic fingergrip 28 of an control key 24.

Figure 2:
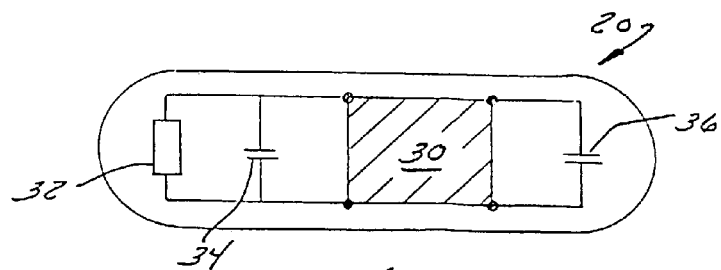
FIG. 2 is a detailed view of the transponder of FIG. 1 showing the microcontroller, the digital memory and the antenna.

Referring now to FIG. 2, the transponder 20 includes a microcontroller 30 in an integrated circuit package, an antenna 32 and a resonance capacitor 34 in series. A charge capacitor 36 is coupled to the package and functions as a power source. The transponder 20 is preferably an RFID transponder such as a Texas Instruments Multipage Transponder (MPT), Selective Addressable Multipage Transponder (SAMPT), or Selective Addressable Multipage Transponder (Secure) (SAMPTS). Other transponders that are acceptable include Microchip, Motorola, or Temic transponders. The microcontrollers 30 are programmed to provide individual and selectable "read" and "read-write" access to their internal digital memory. Their internal memory space preferably contains approximately 80 or more bits of stored information. The memory is preferably arranged in separately addressable pages of memory.

To energize the transponder 20, the transponder is moved into an oscillating electromagnetic field 16 generated by the reader circuit 14 (FIG. 1). This field oscillates at the resonant frequency of the antenna 32 and resonance capacitor 34, causing an oscillating current to build up between these two components. This oscillating current charges capacitor 36. The charge saved in capacitor 36 is then used to power microcontroller 30.

Once microcontroller 30 is powered, it filters the signal that is generated in the antenna and resonance capacitor and extracts superimposed data carried by the electromagnetic field. Based on preprogrammed instructions in an integral read-only memory, microcontroller 30 responds to the received data, which includes "read" and preferably "write" instructions. If the received instructions are "read" instructions, microcontroller 30 selects a particular data item from its internal memory to be transmitted to the vehicle, and transmits this data via antenna 32. Reader circuit 14 receives and processes the information transmitted by the transponder 20. If the instructions are "write" instructions, microcontroller 30 receives data from the vehicle via field 16 and stores this data in its internal memory.

In a first embodiment, the data stored in the memory of microcontroller 30 may include numeric values that are remotely downloaded into the transponder 20 and indicate operating parameters of the work vehicle such as (1) a total distance which the work vehicle is permitted to travel, (2) a geographical area in which the vehicle may only be operated, (3) allowed times and dates of operation, such as (i) the specific hours during the day when the vehicle may be operated or (ii) the specific dates on which it may be operated, (4) the total time of authorized operation, and (5) the vehicle subsystems that the operator is authorized to use.

In a second embodiment, the data stored in microcontroller 30 of the transponder may also include data downloaded from the vehicle itself, such as (1) the distance traveled by the vehicle, (2) the date and times of specific events, such as the time the vehicle was started and the time the vehicle was stopped, (3) time-triggered elapse records, such as service reminders, and when a vehicle rental period expires, (4) vehicle conditions, such as a threshold or maximum engine load experienced by the vehicle during operation and the current odometer reading, (5) fault or error conditions experienced during operation, such as low fuel conditions, low oil or oil pressure conditions, engine coolant over-temperature, engine electrical output too low or too high, and (6) amount of consumables remaining in vehicle, such as the fuel level, coolant level, oil level, and pressurized fluid level.

Figure 3:
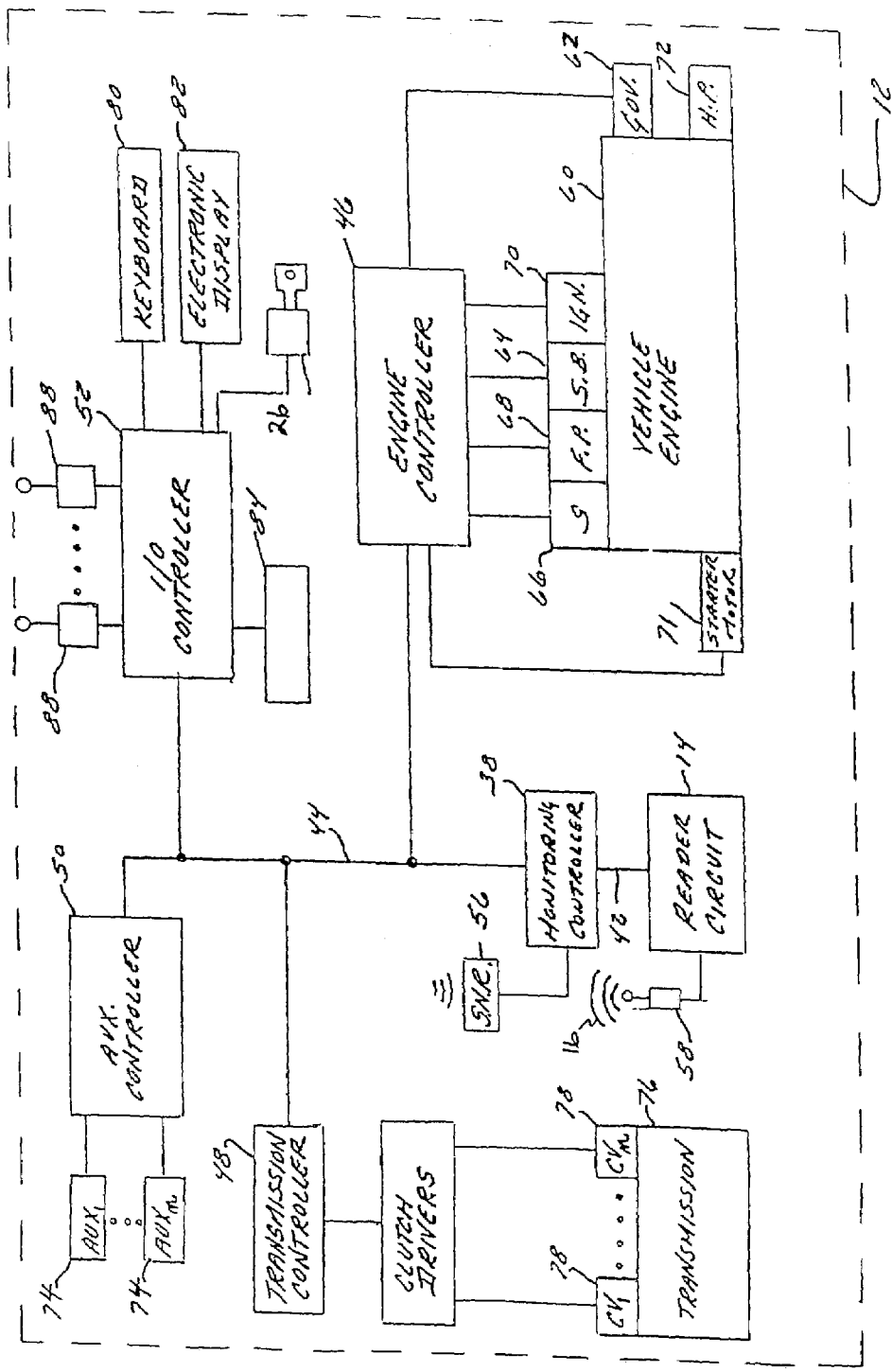
FIG. 3 is a detailed view of the vehicle control system of FIG. 1 showing a plurality of vehicle subsystems or components and their interconnections, including the reader circuit that receives data from the transponder.

FIG. 3 shows vehicle control system 12 of FIG. 1 in more detail. Control system 12 includes a vehicle monitoring and status controller 38 that is coupled to reader circuit 14 over an RS485 telecommunications link 42. Control system 12 also includes other microprocessor-based controllers that are coupled together with monitoring controller 38 by vehicle serial bus 44. These controllers include an engine controller 46, a transmission controller 48, an auxiliary controller 50, and an operator I/O controller 52.

Monitoring controller 38 is coupled to a satellite navigation receiver 56 that is configured to receive radio transmissions from satellites and to convert them into data indicating the vehicle's current location such as latitude and longitude. Controller 38 is also coupled to reader circuit 14 that communicates with transponder 20.

Reader circuit 14 includes a radio frequency module, such as a Texas Instruments RI-RFM-007B and a control module such as a Texas Instruments RI-CTL-MB6A. The control module is the interface between the radio frequency module and controller 38. The control module controls the transmitting and receiving functions of the radio frequency module according to commands sent over the serial connection from controller 38 to the control module. The control module decodes the received RF signals, checks their validity and handles their conversion to a standard serial interface protocol—which, in the preferred embodiment, includes an RS-485 interface. Hence, the RS 485 serial communication link 42 is provided between reader circuit 14 and controller 38.

Controller 38 directs reader circuit 14 by issuing several commands over the RS-485 connection to the control module. These commands include a query command to query for any transponder in range, and a specific query command to query for a specific transponder by its embedded identification number. While it is possible for all the vehicle and operator information in transponder 20 to be transmitted as one long string of bits, it is more efficient and faster to arrange the data into a series of "pages" in transponder 20 that can be individually retrieved by controller 38 on a page-by-page basis. In this manner, controller 38 need not wait until the entire contents of transponder 20 are downloaded to reader circuit 14 and hence to controller 38, but can selectively request specific items of information that are specific to the particular task that controller 38 is attempting to perform.

The specific query command causes reader circuit 14 to generate and transmit radio signals through antenna 58 into the surrounding environment of the operator station and near proximity to the operator station. If any transponder is close enough to be energized by the electromagnetic field 16 generated by antenna 58, it is energized and internally checks to see if it has the identification number broadcast by antenna 58. If so, it responds with an affirmative message, and thereby establishes a communication session with controller 38.

On the other hand, when a general query is transmitted, all transponders in the vicinity that are close enough to be energized may respond to the inquiry with a response that includes their identification number. The transponders may be part of a control access system in which each authorized vehicle operator has his own transponder 20 and is preferably uniquely identified by his transponder. Thus, each transponder in a fleet of work vehicles preferably has a different identification number stored in its memory in microcontroller 30, and thus can uniquely identify the operator carrying the transponder. By using the general query, reader circuit 14 can single out and identify any transponder 20 within range. The reader 14 can subsequently single out and communicate with each transponder in range by transmitting successive specific queries that successively identify each of the transponders in the vicinity.

Once the reader circuit 14 establishes the existence of a particular transponder 20 within the range of its antenna 58, it then continues the communications session by sending a request to the transponder to communicate information from the memory of microprocessor 30 to the reader circuit 14 and then to controller 38 for processing. The transponders that are currently commercially available have a limited amount of memory that can be written to or read from. As transponders develop, more memory space in transponders will be available for storage and retrieval. Currently, it may take an extended period of time to transmit all the operator information from the transponder 20 to the vehicle 10 when the operator approaches the vehicle to start it. As a result, the vehicle operator may wait for a period of time for the initial communication session to complete and controller 38 to permit the work vehicle to be operated.

To speed up this initial communication between the transponder 20 and the work vehicle 10, reader circuit 14 can continuously and periodically transmit general or specific queries. In this manner, as an authorized vehicle operator with a transponder approaches the vehicle or enters the vehicle cab or operator station 18, the initial communication between the transponder and the vehicle can commence automatically without operator initiation. Once the operator is within range, the transponder 20 will be automatically energized by field 16, and will transmit the information requested by the vehicle even before the operator has situated himself in the operator's seat and attempts to start the vehicle engine.

By the time the operator indicates that he wants to start the vehicle, such as by activating the control switch 26 with a control key, or pressing an "engine start" or other similar button on keyboard 80, the initial communication between the transponder 20 and the vehicle control system 12 will provide the control system with the information it needs to determine whether or not the operator is authorized to operate the vehicle. There may be a delay between the time the operator starts the engine and the vehicle gets underway.

There are drawbacks to automatic and periodic querying in the vicinity of the vehicle, however. It can cause the vehicle battery to drain. Also, if the electromagnetic field extends outside the vehicle, another transponder for another control system near the vehicle could be inadvertently energized, and the vehicle could then mistakenly gather information and prepare the work vehicle for operation. Thus, another transponder could inadvertently establish communication with the vehicle control system 12 due to its automatic querying. The vehicle could gathered data from the unintended transponder and assumed that the operator was going to operate the vehicle. An unauthorized operator could then enter the vehicle and operate it. This could be a problem if there were no special activating device, such as a key, required for operation.

To reduce the risk of an unintended transponder 20 initializing the vehicle, the transponder 20 and the antenna 58 of reader circuit 14 are preferably configured such that the transponder must be inside the vehicle before the electromagnetic field is sufficient to energize the transponder. Alternatively, they are configured such that the transponder is energized even when outside the vehicle, but the radio signal transmitted by the transponder is not sufficiently strong from outside the vehicle to return to the circuit 14. In either case, a passing transponder will not inadvertently establish communication with reader circuit 14.

In a further alternative embodiment, controller 38 can be configured to wait until an operator engages a control switch 26 on the vehicle (preferably, but not necessarily an ignition switch) before it signals reader circuit 14 to generate the electromagnetic field that energizes the transponder and subsequently to query the transponder in the vicinity of reader 14. By waiting until the operator engages the control switch 26 or other user interface before generating the electromagnetic field in response to an affirmative action by the operator, the vehicle battery life is extended.

When a control switch 26 is used, the switch will start the vehicle in a typical manner, but any additional functions will not be enabled until vehicle monitoring controller 38 has received the data stored in transponder 20 and determined whether the operator is authorized to operate specific vehicle systems. For example, during the starting process, controller 38 will not authorize the transmission controller 48 to engage the transmission 76 in a gear ratio. Once the authorization data has been received from transponder 20 by reader circuit 14, the data is formatted and transmitted to controller 38 for processing.

Controller 38 also communicates with the other controllers by transmitting packets of data on the communications bus 44 extending between the various controllers on the vehicle. These packets of data may be broadcast to all the controllers with a header indicating the contents of the packet, or they may be transmitted to individual controllers with a header identifying a specific controller address, as well as information indicating the contents of the data in the packet. Any of the data items received from transponder 20 can be transmitted in this manner.

Controller 38 receives packets of data indicative of vehicle status and vehicle events that are transmitted by the other controllers via the CAN bus, such as the engine RPM, engine load, engine throttle position, the distance traveled, elapsed time since last oil change, the oil change intervals, the engine oil temperature, the engine coolant temperature, the engine oil level, the elapsed hours of total engine operation, error conditions experienced by any of the controllers, the vehicle's geographical location, as well as any operator requests to operate specific subsystems or subcomponents of the vehicle.

Controller 38 periodically compares the data it receives from the other controllers and from its own sensors, for example the receiver 58, with the transponder data it received from the transponder 20 to determine whether the operator has exceed any of the operational limits that were indicated by the transponder data. For example, if the engine may be operated for only a predetermined number of hours, controller 38 compares the elapsed engine hour data received from the engine controller 46 with the authorized hours received from the transponder 20 and initiates one or more predetermined functions based upon the result of that comparison.

If the authorized limits are exceeded, and depending upon the priority of the particular transponder limits, controller 38 will transmit a packet that shuts down a particular vehicle subsystem. For example, controller 38 may direct the engine controller 46 to shut down the fuel pump, the ignition system, or to limit the speed of the vehicle or the engine. At substantially the same time, controller 38 will preferably transmit a packet to I/O controller 52 direct it to display a message indicating what limit has been exceeded.

In other situations, especially if the priority of the authorized limits is lower, controller 38 may only send a packet to the I/O controller 52 telling it to display a message indicating that a particular limit has been exceeded, but not sending a packet to engine controller 46 directing it to shut down any of the sub-systems it controls. For example, if the vehicle is a rental vehicle and it is traveling down the highway at 40 miles per hour, the engine cannot be stopped immediately. Thus, exceeding a permitted distance of travel or a permitted zone of travel while the vehicle is moving at a predetermined speed or greater would be a low priority message and controller 38 would not shut the engine subsystems down. On the other hand, if the operator is only permitted to use the vehicle radio for 10 hours, the radio could be shut down immediately causing no problems (a high priority message).

Engine controller 46 is coupled to the vehicle engine 60 that it monitors and controls. Engine 60 may be a spark ignition or a diesel engine, for example. One way engine controller 46 controls the engine is by sending a signal to the engine governor 62, typically indicating a commanded fuel flow rate or power output. The governor, in response to this signal, varies the rack position of the fuel injector system in a mechanical system, or transmits an electronic signal to each of the fuel injectors in an electrical injector system. Alternatively, the governor 62 may open or close a combustion air valve or "throttle valve" that regulates the flow of air to each combustion chamber of the engine. The governor 62, if electronic, transmits a signal back to engine controller 46 that indicates the speed of the engine. As an alternative, a separate engine speed sensor 64 can be provided, such as a shaft speed sensor or a sensor that monitors the fluctuations in the electric output of the engine alternator. The frequency of these fluctuations are proportional to the speed of the engine.

Engine controller 46 is also coupled to several sensors 66 that are directly coupled to the engine to generate signals indicative of oil pressure (oil pressure sensor), oil temperature (oil temperature sensor), coolant water temperature (coolant temperature sensor), engine speed (sensor 64) and engine load.

Engine controller 46 is also coupled to fuel pump 68 to either enable or disable the fuel pump by connecting or disconnecting power to the pump. The fuel pump uses mechanical or electrical feedback to automatically maintain the desired fuel pressure of the fuel provided to the engine.

Engine controller 46 is also coupled to ignition system 70 of the engine (for spark ignition engines) to either energize or de-energize the ignition under computer control. In addition, engine controller 46 is coupled to the engine starting motor 71 to turn the motor on or off under computer control.

The engine controller 46 is therefore configured to monitor various conditions of the engine, as well as directly control the operation of the engine by selectively enabling or disabling engine subsystems such as ignition, fuel, and starting.

Auxiliary controller 50 controls the operation of various fluid powered subsystems of the work vehicle. Engine 60 drives a fluid pump 72 that provides a source of pressurized (usually hydraulic) fluid. The pressurized fluid is controlled and directed by auxiliary controller 50. Auxiliary controller 50 is coupled to and drives several auxiliary fluid valves 74 ($AUX_1 \ldots AUX_n$). These valves are typically on-off valves or pulse-width modulated proportional control valves that regulate the flow of pressurized fluid. If vehicle 10 is a backhoe or has a backhoe attachment, for example, auxiliary controller 50 and valves 74 control the flow of pressurized fluid to a swing actuator, a lift actuator, a dipper actuator and a bucket actuator. The actuators are each coupled to and controlled by at least one auxiliary valve 74. One or more additional valves are provided to control the flow of pressurized fluid to or from various fluid driven implements that are mounted on the end of the backhoe lift arm. If the vehicle is a dump truck, for example, auxiliary controller 50 controls the flow of fluid to and from the fluid actuators that lift the box of the truck to dump it. If the work vehicle has a loader, for example, auxiliary controller 50 regulates the flow of fluid to and from the lift arm actuators. The bucket or tilt actuators raise, lower, and tilt the bucket. The vehicle operator can be authorized or denied the operation of any or all of these auxiliary fluid actuated subsystems by data in the transponder 20.

Transmission controller 48 controls the shifting of the vehicle transmission 76. Controller 48 is coupled to and drives several clutch control valves 78 ($CV_1 \ldots CV_n$ in FIG. 3) that in turn control the flow of pressurized fluid to and from the fluid clutches in the transmission. These valves, depending upon the type of clutches employed, may be on-off valves or proportional control valves.

Transmission controller 48 is also configured to select the particular clutches necessary to engage the transmission in a particular gear ratio and sequentially energizes the clutch control valves 78 so that appropriate gears and shafts are engaged. The transmission is preferably a powershift transmission in which most, if not all, of the gear ratios of the transmission are selectable by filling one or more fluid clutches coupled to valves 78.

Input/output controller 52 drives and responds to operator interface devices such as keyboard 80, display 82, audio annunciator 84, and control switch 26. In addition, one or more control levers 88 are provided for operating the valves controlled by controller 50.

It is through these input devices that the operator commands the vehicle. The keyboard 80 may be arranged as a closely spaced array of buttons, or the buttons may be spread out around the operator station to make them easier to operate.

Display 82 is preferably a liquid crystal display or an electroluminescent display having a region for displaying alphanumeric messages. This region is configured to display a plurality of different messages indicating the data stored in transponder 20 as well as information regarding the status of the vehicle, such as alarm conditions including (1) engine coolant water temperature too high, (2) engine coolant level too low, (3) engine lubricating oil temperature too high, (4) engine lubricating oil pressure too low, (5) fluid pressure too low, or (6) fluid temperature too high. Display 82 is preferably a multi-line display.

In addition, display 82 is configured to display the status of the work vehicle 10 based upon data retrieved from the transponder 20. For example, if the vehicle operator is not authorized to operate a particular subsystem of the vehicle as indicated by the data initially communicated to controller 38 from transponder 20, display 82 is configured to display these limitations on display 82 when the operator starts the vehicle. Some of the data communicated from the transponder 20 to controller 38 indicates limits on use of the vehicle such as the number of hours of permitted use, the total distance of permitted travel, the maximum speed of permitted operation, the maximum load on the engine and the geographical area in which the vehicle is permitted to operate. These are conditional limitations, since they may never prevent use of the vehicle unless they are exceeded. For this reason, display 82 is also configured to display messages as these limits are approached.

If the vehicle approaches the geographical limits of operation as determined by the controller 38, for example, display 82 is programmed to display an alphanumeric message indicating this impending condition with a notice such as "This vehicle cannot be used outside of Michigan."

When the operator approaches the maximum number of hours or miles of operation as determined by controller 38, display 82 is configured to display an alphanumeric message indicating this impeding condition, by displaying a message such as "Only 15 minutes remain to operate the vehicle" or "Only 20 miles remain to operate the vehicle". Similar messages are displayed when the vehicle approaches its maximum permitted speed and maximum permitted load as indicated by data downloaded from the transponder 20.

Other data communicated or downloaded from transponder 20 may indicate other limits on operation. For example, an operator may not be permitted to operate specific subsystems of the vehicle, such as (1) the various fluid actuated devices including a front loader or backhoe that are attached to or an integral part of the vehicle, or (2) to gain physical access to parts of the vehicle, such as by preventing operation of the glove compartment latch, engine compartment latch, gas tank cover latch or trunk latch, or (3) preventing various accessories from being operated, such as a radio, vehicle heater, air conditioner, tape or CD player, navigation computer, or video system.

When these various devices and subsystems are impermissible to use, display 82 is configured to generate an alert message when the operator attempts to use them by displaying an appropriate message indicating that, for example, (1) use is not permitted, and (2) the identity of the device the operator attempted to operate.

A message could be displayed symbolically. For example, if the transponder 20 indicated that the backhoe mechanism is not authorized to be used, the display could show a device symbol in the shape of the backhoe. The international "not permitted" symbol of a red circle with a diagonal line through it could be superimposed on top of the device symbol when the operator moves levers 88 in an attempt to operate the backhoe mechanism. Alternatively, a message could be displayed in words, for example, "The backhoe may not be used".

Input/output controller 52 is also configured to energize audio alarm 84 substantially simultaneously with the appearance of a message to draw the operator's attention away from the device he is attempting (and not permitted) to operate and to the appropriate message on display 82.

All the controllers on bus 44 are in constant communication with each other while the vehicle is operated. As the transmission controller 48 changes gear ratios and shifts the transmission, it packetizes information indicating the gear ratio or occurrence of a shift and places it on the bus for the other controllers to use.

As the engine controller 46 controls the operation of the engine, it packetizes information relating to the engine and places that information on the bus for the other controllers to use. This information includes such data as the engine speed, values indicative of the various engine oil and water temperatures and pressures provided by the sensors, and the total elapsed hours of engine operation discussed above.

As the auxiliary fluid controller 50 operates the various fluid actuators and valves, it packetizes information indicating which valves 74 are open and closed, and by how much they are opened and closed, and places these packets on the bus for the other controllers to use.

As the input/output controller 52 monitors the user input devices including operator levers 88, keyboard 80 and control switch 26, it packetizes the operator requests and places the packets on the bus indicating the particular operational requests made by the operator. The information may also include packets indicating the operator attempts to operate the various subsystems of the vehicle he is not authorized to operate.

The monitoring and communications controller 38 similarly packetizes the data it receives from the transponder 20 and places it on the serial bus 44 for the other controllers to use.

In this manner, each controller 38, 46, 48, 50 and 52 is made aware of the state of the various devices and actuators controlled or monitored by the other controllers.

Just as the various controllers are configured to transmit packetized information on bus 44 for use by other controllers, they are also configured to receive packetized information transmitted from the other controllers and use this data internally for their own programmed operations.

Monitoring controller 38, for example monitors the status of information transmitted by the other controllers that indicates the status of the other controllers and the subsystems and components to which they are attached. For example, when the operator manipulates levers 88 in an attempt to move the various fluid actuated components that are controlled by auxiliary controller 50, I/O controller 52 places a packet indicative of this request on bus 44. Controller 38 reads this packet and compares the operator request with the data that it has received from transponder 20 and determines whether the operator is authorized to operate the requested fluid actuated device. If the operator is authorized, controller 38 signals approval by packetizing and forwarding the request to controller 50. Alternatively, if the operator is not authorized to operate the device, such as a fluid actuated implement, monitoring controller 38 will not forward the operator request to controller 50. Instead, controller 50 will send a packet to I/O controller 52 directing it to display a message indicating that the requested operation is not permitted. Controller 52, when it receives this packet of information will display an alert message as discussed above, and will optionally energize annunciator 84, causing it to generate a sound to get the operator's attention.

As engine controller 46 operates, it transmits packets on bus 44 indicative of the elapsed time the engine has been operated. Controller 38 receives this information, compares it with any time limit of engine operation that it received from transponder 20 and, if the vehicle is approaching the time limit of engine operation, transmits a packetized message to I/O controller 52 directing it to display a message indicating the approaching time limit. Controller 52 will responsively display the requested message and will preferably energize annunciator 84 causing it to generate a sound to get the operator's attention.

Controller 38 also receives the data indicative of the vehicle current position from GPS receiver 56, and compares it with the data indicative of the permitted geographical area of operation received from transponder 20. If the vehicle is approaching the geographical limit of operation or has exceeded it, for example, controller 38 transmits a packet to I/O controller 52 directing it to generate a corresponding message. Controller 52 displays that message in response.

Engine controller 46 is configured to transmit packets of data indicative of elapsed engine hours, engine RPM and engine load among other data. Controller 38 receives these packets and compares this data with the data indicative of permitted engine speed and engine load that were downloaded from transponder 20. If the engine RPM or load approaches the authorized engine RPM or load, controller 38 transmits a packet to I/O controller 52 indicative of these conditions. In response, controller 52 transmits a message to display 84 to indicate this condition. In addition, controller 38 transmits packetized data to engine controller 46 directing engine controller 46 to limit the RPM and/or load to the approved limits indicated by the data retrieved from transponder 20. Engine controller 46 will, in response, prevent the engine from exceeding the load and RPM limit by controlling the engine governor or throttle valve to maintain the engine at or below the load or RPM limit. Alternatively, controller 38 may be configured to transmit the engine speed and load limits to engine controller 46 on startup (when controller 38 reads the data stored in transponder 20), and engine controller 46 can be configured to maintain these speed and load limits by itself, without input from controller 38 by periodically comparing the actual speed and load with the speed and load limits sent to it by controller 38 and automatically preventing the engine from exceeding these limits.

Figure 4:
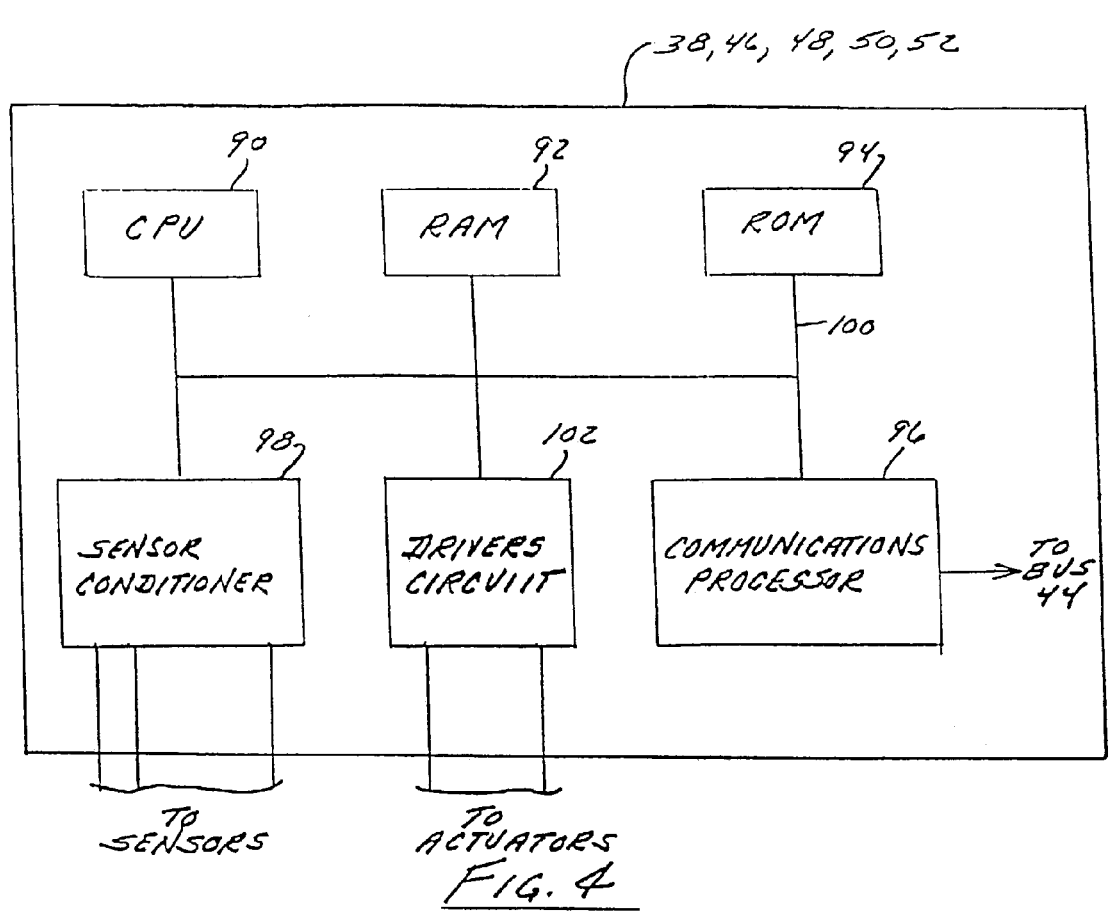
FIG. 4 illustrates an exemplary controller of those shown in FIG. 3.

Referring now to FIG. 4, each controller (including controller 38) of FIG. 3, includes a microprocessor 90, RAM memory 92 and ROM memory 94, as well as a dedicated communications processor 96 configured to handle all communications over bus 44 with the other controllers on the bus (FIG. 3).

Each controller also includes a sensor conditioning circuit 98 that interfaces the sensor signals (such as engine sensors 66, levers 88, keyboard 80, switch 26) to bus 100. Circuit 98 filters and buffers the signals to eliminate noise, and may include sample-and-hold sub-circuits as well as analog-to-digital converters for processing analog sensor signals.

In addition, each controller includes a driver circuit 102 that controls the application of power to the actuators, including the valves driven by the transmission and auxiliary controllers, the fuel pump, the governor and ignition system driven by the engine controller, and the electronic display driven by the I/O controller. The microprocessor, RAM, ROM, and communications processor are all coupled together by control/data/address bus 100 within each controller.

The ROM memory 94 contains the programmed instructions that control the operation of the microprocessor 90 in that controller.

The RAM memory 92 is used to store working variables required by the microprocessor. A particularly preferred processor for each of the controllers is a MC68HC11, MC68HC908AZ60, MPC555, or MPC565 microprocessors by Motorola. The preferred dedicated communications processor is any of the stand alone CAN processors, such as those manufactured by Microchip or Phillips. The advantage to the Motorola 68HC908AZ60, the MPC555, and the MPC 565 processors is that they include both the communications processor and the microprocessor on the same die and therefore in a single package.

Thus, each of the controllers shown in FIG. 3 is coupled to the other controllers of FIG. 3 by a serial communications bus 44. Each controller has its own internal communications bus 100 that couples the microprocessor, RAM, ROM, and dedicated communications processor of each controller. Each controller likewise controls one or more subsystem of the work vehicle and receives necessary data regarding the control of its subsystems from the other controllers. When the vehicle operator inserts his control or ignition key 24 into the control or ignition switch 26, monitoring controller 38 determines from the transponder 20 whether the transponder 20, and thus the operator carrying the key and transponder, are authorized to use and operate the work vehicle 10. If the operator does not have the proper authorization to operate the vehicle, monitoring controller 38 does not signal the engine controller 46 to permit the unauthorized operator to activate the starting subsystem, the fuel subsystem, or the ignition subsystem of the engine. Similarly, if the transponder 20 carried by the operator does not indicate that the operator is authorized to operate the auxiliary equipment, monitoring controller 38 does not transmit permission to the auxiliary fluid controller 50 that enables the fluid valves 74 to respond to the operator manipulation of the operating control levers 88.

As a result, both the engine and the auxiliary fluid system are or remain disabled. The two vehicle systems are disabled independently of each other since monitoring controller 38 must individually signal both the engine controller 46 and the fluid controller 50 to permit use of the engine and the auxiliary fluid system.

As a result, if an unauthorized user, such as a joy rider or thief, manages to hotwire the engine by applying electricity directly to the fuel pump or to the ignition coils or to the starting system, for example, the user may be able to start the vehicle engine. However, the monitoring controller 38 also controls the auxiliary fluid controller 50 by transmitting approval to operate the fluid actuated devices on the vehicle. Thus, the vehicle will not respond to the unauthorized operator request to operate those devices. Thus, there is a second independent mechanism for disabling the work vehicle, or of maintaining the vehicle in a disabled condition, should an unauthorized user, such as a thief, manage to get the engine started. The second security mechanism is the independent disablement of another vehicle function, or withholding of enablement of a function, such as the auxiliary fluid controller or the transmission controller.

While the embodiments illustrated in the FIGURES and described above are presently preferred, it should be understood that these embodiments are offered by way of example only. For example, the principles of the present invention may find applications in automotive, agricultural and construction vehicles. The transponder may be a self-powered radio transmitter or transmitter/receiver. The invention is not limited to a particular embodiment, but extends to various modifications that nevertheless fall within the scope of the appended claims.

What is claimed is:

1. A method for controlling access to a work vehicle having an operating control system including an engine system, a transmission system and an auxiliary fluid actuator system, the work vehicle being accessible with a control key and a transponder, the method comprising:
    transmitting data indicative of an authorized degree of access to the operating control system on the vehicle from the transponder;
    comparing the transmitted data with data stored in the vehicle operating control system to determine the authorized degree of access to the work vehicle;
    limiting access to the work vehicle if a proper level of access is not authorized by the transmitted data by disabling at least two systems of the work vehicle, wherein the step of limiting access includes the step of preventing an unauthorized operator from operating at least one of the auxiliary fluid actuators including a swing actuator, a boom actuator, a dipper actuator, a tilt actuator; a loader actuator and a lift arm actuator; and
    activating the work vehicle using the control key.

2. The method of controlling access to a work vehicle of claim 1, wherein limiting access to the work vehicle includes disabling at least one subsystem, of the engine system including an engine ignition subsystem, an engine fuel subsystem, and an engine starting subsystem.

3. The method of controlling access to the work vehicle of claim 1, wherein limiting access to the work vehicle includes disabling at least one auxiliary fluid actuator subsystem of a plurality of fluid actuators.

4. The method of controlling access to a work vehicle of claim 3, wherein disabling at least one auxiliary fluid actuator comprises electronically preventing the operation of valves for operating the fluid actuators.

5. The method of controlling access to a work vehicle of claim 4, further comprising communicating a packetized message over a serial communication bus that couples at least two microprocessor-based electronic controllers wherein one of the at least two microprocessor-based electronic controllers includes an auxiliary fluid controller coupled to one of the plurality of auxiliary fluid actuators.

6. A control system for controlling access to a work vehicle having an engine with engine subsystems, a transmission, and an auxiliary fluid controller coupled to and configured to control a plurality of fluid actuators, the control system comprising:
    a control switch on the work vehicle;
    a control key configured to operate the control switch;
    a transponder coupled to the control key and containing data indicative of an authorized level of access to the work vehicle; and
    a vehicle control system coupled to the control switch and in electronic communication with the engine, the transmission and the auxiliary fluid controller;
    wherein the transponder is configured to transmit data indicative of an authorized level of access to the work vehicle control system, and the vehicle control system is configured to responsively compare the transmitted data with data stored in the vehicle control system to determine the authorized level of access and to responsively limit access to the work vehicle by disabling at least one subsystem of the engine and to responsively and additionally limit access to one of the transmission and at least one of the auxiliary fluid actuators by disabling at least one of the transmission and auxiliary fluid actuators;
    and wherein the vehicle control system is configured to electronically prevent an unauthorized operator from operating at least one of the auxiliary fluid actuators including a swing actuator, a boom actuator, a dipper actuator, a tilt actuator; a loader actuator and a lift arm actuator.

7. The control system of claim 6, wherein the engine subsystems comprise an engine ignition subsystem, and the vehicle control system is configured to control access to the engine by disabling the engine ignition subsystem.

8. The control system of claim 6, wherein the engine subsystems comprise an engine fuel subsystem, and the vehicle control system is configured to control access to the engine by disabling the engine fuel subsystem.

9. The control system of claim 6, wherein the engine subsystems comprise an engine starting subsystem, and the vehicle control system is configured to control access to the engine by disabling the engine starting subsystem.

10. The control system of claim 6, further comprising a serial communication bus coupling an engine controller, a transmission controller and an auxiliary fluid actuator controller of the vehicle control system.

11. The control system of claim 6, wherein the transponder is a radio transponder.

12. A control system for controlling access to a work vehicle having an engine with engine subsystems, a transmission, and an auxiliary fluid controller coupled to and configured to control a plurality of fluid actuators, the control system comprising:

- a control switch on the work vehicle;
- a control key configured to operate the control switch;
- a transponder coupled to the control key and containing data indicative of an authorized level of access to the work vehicle; and
- a vehicle control system coupled to the control switch and in electronic communication with the engine, the transmission and the auxiliary fluid controller;

wherein the transponder is configured to transmit data indicative of an authorized level of access to the work vehicle control system, and the vehicle control system is configured to responsively compare the transmitted data with data stored in the vehicle control system to determine the authorized level of access and to responsively limit access to the work vehicle by disabling at least one subsystem of the engine and to responsively and additionally limit access to one of the transmission and at least one of the auxiliary fluid actuators by disabling at least one of the transmission and auxiliary fluid actuators;

and wherein the vehicle control system is configured to prevent an unauthorized operator from using a fluid actuator of one of a backhoe, a front loader, and a work vehicle having a lift arm.

* * * * *